US008955514B2

(12) United States Patent
Leuschner et al.

(10) Patent No.: US 8,955,514 B2
(45) Date of Patent: Feb. 17, 2015

(54) FACEPIECE WITH OPEN PORT

(75) Inventors: Carsten Leuschner, Schonefeld (DE); Klaus Schmidtke, Berlin (DE); Michael Horn, Berlin (DE); Christopher L. Prete, Cranberry Township, PA (US); Marco Tekelenburg, Zelienople, PA (US)

(73) Assignee: MSA Technology, LLC., Cranberry Township, PA (US)

( * ) Notice: Subject to any disclaimer, the term of this patent is extended or adjusted under 35 U.S.C. 154(b) by 687 days.

(21) Appl. No.: 13/167,794

(22) Filed: Jun. 24, 2011

(65) Prior Publication Data

US 2012/0160245 A1 Jun. 28, 2012

Related U.S. Application Data

(60) Provisional application No. 61/360,935, filed on Jul. 2, 2010.

(51) Int. Cl.

| | |
|---|---|
| ***A62B 7/04*** | (2006.01) |
| ***A62B 18/02*** | (2006.01) |
| ***A62B 18/08*** | (2006.01) |
| ***A62B 18/10*** | (2006.01) |
| ***F16K 31/26*** | (2006.01) |

(52) U.S. Cl.

CPC ................. *A62B 18/10* (2013.01); *A62B 18/08* (2013.01)

USPC ............ 128/204.26; 128/205.25; 128/206.15; 128/207.12

(58) Field of Classification Search

CPC ........... A62B 18/08; A62B 18/10; A62B 9/04

USPC ............. 128/201.17, 201.19, 201.22–202.11, 128/202.27, 204.18, 204.26–204.27, 128/204.29, 205.12, 205.22, 205.25, 128/206.12, 206.15, 206.17, 206.24, 128/205.24, 206.28, 207.12

See application file for complete search history.

(56) References Cited

U.S. PATENT DOCUMENTS

| | | | | | |
|---|---|---|---|---|---|
| 4,197,841 | A * | 4/1980 | Brauer et al. | ............ | 128/202.13 |
| 4,821,767 | A | 4/1989 | Jackson | | |
| 5,016,627 | A | 5/1991 | Dahrendorf | | |
| 5,271,390 | A * | 12/1993 | Gray et al. | ............... | 128/207.12 |
| 5,318,018 | A | 6/1994 | Puma | | |
| 5,775,323 | A * | 7/1998 | Knott | ....................... | 128/202.27 |

(Continued)

FOREIGN PATENT DOCUMENTS

| | | | |
|---|---|---|---|
| WO | WO9709091 | A1 | 3/1997 |
| WO | WO2007123585 | A1 | 11/2007 |

*Primary Examiner* — Tan-Uyen (Jackie) T Ho
*Assistant Examiner* — Mark K Han
(74) *Attorney, Agent, or Firm* — Bartony & Associates, LLC

(57) ABSTRACT

A respiration system includes a regulator including an inlet for connection to a source of pressurized gas and an outlet for delivery of the gas to the user, and a respiration facepiece for use in connection with the regulator including an interface removably attachable to the regulator, at least one seal system adapted to form a sealing engagement with the face of a user, an inhalation port in fluid connection with the regulator interface and with the facepiece interior, an inhalation check valve in fluid connection between the inhalation port and the facepiece interior; an exhalation port in fluid connection with the facepiece; an exhalation check valve in fluid connection with the exhalation port; and an ambient port separate from the inhalation port and from the exhalation port, which is in fluid connection with the facepiece interior without an intervening check valve.

13 Claims, 12 Drawing Sheets

(56) References Cited

U.S. PATENT DOCUMENTS

| | | | | |
|---|---|---|---|---|
| 6,263,871 | B1 * | 7/2001 | Brown et al. | 128/200.29 |
| 6,394,091 | B1 * | 5/2002 | Giorgini | 128/206.21 |
| 6,412,485 | B1 | 7/2002 | Saieva | |
| 6,561,189 | B2 * | 5/2003 | Schmidtke | 128/206.23 |
| 6,899,101 | B2 * | 5/2005 | Haston et al. | 128/204.26 |
| 7,234,462 | B2 * | 6/2007 | Palazzotto et al. | 128/201.19 |
| 7,261,104 | B2 * | 8/2007 | Kiefer et al. | 128/201.17 |
| 7,762,252 | B2 * | 7/2010 | Prete | 128/204.18 |
| 7,836,886 | B2 * | 11/2010 | McDonald et al. | 128/205.25 |

* cited by examiner

FACEPIECE WITH OPEN PORT

CROSS-REFERENCE TO RELATED APPLICATION

This application claims benefit of U.S. Provisional Patent Application Ser. No. 61/360,935, filed Jul. 2, 2010, the disclosure of which is incorporated herein by reference.

BACKGROUND

The following information is provided to assist the reader in understanding the devices, systems and/or methods disclosed below and the environment in which such devices, systems and/or methods will typically be used. The terms used herein are not intended to be limited to any particular narrow interpretation unless clearly stated otherwise in this document. References set forth herein may facilitate understanding of the devices, systems and/or methods or the background. The disclosure of all references cited herein are incorporated by reference.

A supplied-air respirator such as self-contained breathing apparatus (SCBA) permits a person to breath in hazardous environments such as fires and confined spaces where breathing would be difficult or impossible without mechanical aid. A supplied-air respirator may, for example, include a full facepiece, a harness and carrier assembly, an air cylinder full of high pressure compressed air for breathing and at least one, and more typically two, air-pressure regulators. The first or first-stage regulator is typically mounted near the air cylinder and functions to reduce the relatively high pressure of the compressed air from the air cylinder to above atmospheric pressure. The air cylinder typically contains air or gas under high pressure (for example, 2200 psi to 4500 psi). The first stage regulator may, for example, reduce the pressure to about 80-100 psi. The second or second-stage regulator is typically mounted on the facepiece and functions to adjust the flow of air to meet the respiratory needs of the user. Respiration-controlled regulator assemblies are disclosed, for example, in U.S. Pat. Nos. 4,821,767 and 5,016,627.

The facepiece or face mask, which is sealed to the face of the user, typically includes a lens through which the user can view the surrounding environment. The facepiece also includes a port or mount for fluid connection with the second-stage regulator through which inspired air passes into the face mask and an exhalation port through with expired air passes out of the mask. In some facepieces, a single port is used for both inspired and expired air. In other facepieces, separate ports are used. The user's respiration controls a valve system (for example, including an inhalation valve and an exhalation valve) to control delivery of pressurized air via the second-stage regulator. Often, it is desirable to maintain a slight positive pressure within the facepiece relative to ambient pressure. Facepieces for supplied-air respirators in which a positive pressure is maintained within the facepiece are often referred to as pressure demand facepieces, while other facepieces for supplied-air respirators are often referred to as demand facepieces.

The valve system of many facepieces results in resistance to inhalation and exhalation (which must be overcome by the user) when the facepiece is used without the pressure regulator in place (often referred to as a "stand-by" or "ambient" mode of operation). In the case of pressure demand facepieces, the exhalation valve is biased in a closed position (for example, spring-loaded) to maintain a slight positive pressure during normal operation thereof, exacerbating exhalation resistance as compared to demand facepieces. The resistance to inhalation and exhalation can result in discomfort and fatigue for the user.

A number of facepieces have provided open ports therein such that respiration can occur generally without restriction when that the facepiece is used in the stand-by mode (that is, without the pressure regulator in connection therewith). However, such ports usually result in contamination of the pressure regulator, which is undesirable because pressure regulators are often shared between users.

SUMMARY

In one aspect, a respiration system includes a regulator including an inlet for connection to a source of pressurized gas (which includes oxygen) and an outlet for delivery of the gas to the user, and a respiration facepiece for use in connection with the regulator. The facepiece includes an interface to which the regulator is removably attachable, at least one seal system to form a sealing engagement with the face of a user to encompass the nose and mouth of a wearer, an inhalation or inspiration port in fluid connection with the regulator interface and in fluid connection with the interior of the facepiece, at least one inhalation check valve in fluid connection between the inhalation port and the interior of the facepiece; an exhalation or expiration port in fluid connection with the facepiece; an exhalation or expiration check valve in fluid connection with the exhalation port; and an ambient port separate from the inhalation port and from the exhalation port. The ambient port is in fluid connection with the interior of the facepiece without an intervening check valve. The ambient port is in fluid connection with the interface such that the regulator seals the ambient port from fluid connection with the outlet of the regulator upon connection of the regulator to the regulator interface. The inhalation port and the ambient port may, for example, be formed in the interface.

The regulator may, for example, include at least one sealing member to seal the ambient port from fluid connection with the outlet of the regulator upon connection of the regulator to the interface. In a number of embodiments, the regulator includes a first sealing member to form a seal with the inhalation port (for example, with an inner wall thereof) and a second sealing member to form a seal with the interface (for example, with an inner wall thereof).

The system may, for example, further include an adapter to attach a filter to the interface. The adapter includes a facepiece interface adapted to connect to the interface of the facepiece and a filter interface adapted to connect to the filter. In a number of embodiments, the adapter includes an inhalation passage and a separate exhalation passage. In a number of such embodiments, the inhalation passage is in fluid connection with the inhalation port of the facepiece, and the exhalation passage is in fluid connection with the ambient port when the adapter is attached to the interface of the facepiece. The adapter may, for example, further include an exhalation check valve in fluid connection with the exhalation passage.

In a number of embodiments, the regulator further includes a microphone. The microphone may, for example, be positioned to be in general alignment with the ambient port when the regulator is connected to the interface.

In another aspect, a regulator, which is for use with a facepiece including an ambient or an open port in fluid connection with an interior of the facepiece without an intervening check valve, includes an inlet for entry of pressurized breathing gas into the pressure regulator at a first pressure, an outlet for transmitting breathing gas into the facepiece, and at least one sealing member to seal the open port from fluid connection with the ambient atmosphere and from fluid connection with the outlet of the pressure regulator when the regulator is attached to the facepiece. The sealing member may, for example, be adapted to contact an inner wall of the open port. The regulator may further include at least one other sealing member to form a seal with an interface of the facepiece to which the regulator is removably attachable.

The regulator may, for example, further include a microphone. The microphone may, for example, be positioned to be generally aligned with the open port upon connection of the regulator to the facepiece.

In another aspect, a method of reducing resistance to breathing in a facepiece for use with a regulator including an inlet for connection to a source of pressurized gas (which includes oxygen) includes: providing an interface to which the regulator is removably attachable, providing at least one seal system to form a sealing engagement with the face of a user to encompass the nose and mouth of a wearer; providing an inhalation port in fluid connection with the regulator interface and in fluid connection with the interior of the facepiece, providing at least one inhalation check valve in fluid connection between the inhalation port and the interior of the facepiece, providing an exhalation port in fluid connection with the facepiece, providing an exhalation check valve in fluid connection with the exhalation port; and providing an ambient port separate from the inhalation port and the exhalation port. The ambient port is in fluid connection with the interior of the facepiece without an intervening check valve. The ambient port is also in fluid connection with the interface such that the regulator seals the ambient port from fluid connection with the outlet of the regulator upon connection of the regulator to the interface. The inhalation port and the ambient port may, for example, be formed in the interface. In a number of embodiments, the method further includes providing a sealing connection between the regulator and the interface. The regulator may, for example, include a microphone positioned to be in general alignment with the ambient port when the regulator is connected to the interface.

In a further aspect, a regulator for use with a facepiece, which includes a port in fluid connection with an interior of the facepiece, includes an inlet for entry of pressurized breathing gas into the pressure regulator at a first pressure, an outlet for transmitting breathing gas into the facepiece, and a microphone. The regulator may further include at least one sealing member adapted to provide a seal between the microphone and ambient atmosphere.

The devices, systems and/or methods, along with the attributes and attendant advantages thereof, will best be appreciated and understood in view of the following detailed description taken in conjunction with the accompanying drawings.

DETAILED DESCRIPTION

As used herein and in the appended claims, the singular forms "a," "an", and "the" include plural references unless the content clearly dictates otherwise. Thus, for example, reference to "an ambient port" includes a plurality of such ambient ports and equivalents thereof known to those skilled in the art, and so forth, and reference to "the ambient port" is a reference to one or more such ambient ports and equivalents thereof known to those skilled in the art, and so forth.

Figure 1:
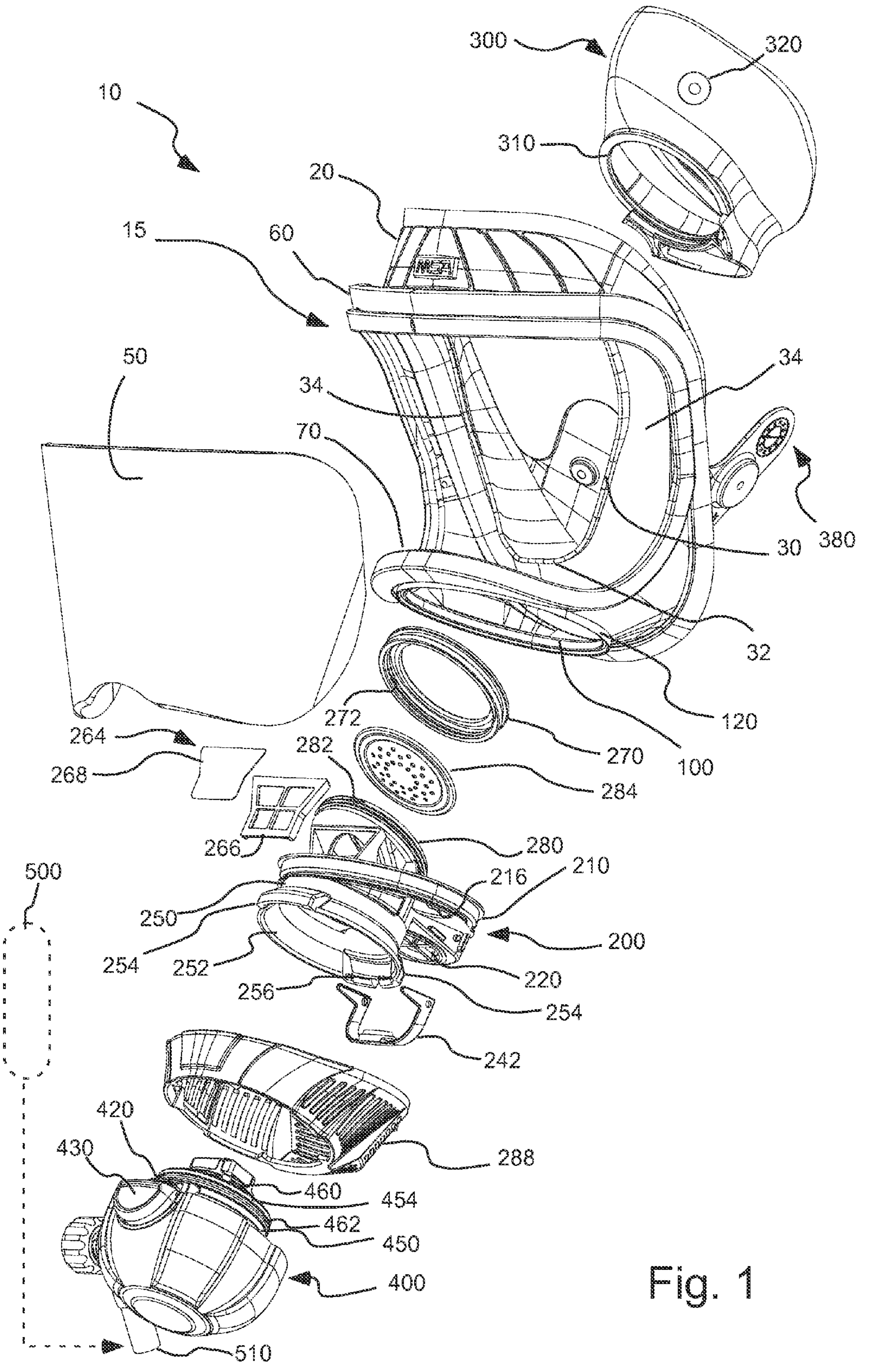
FIG. 1 illustrates an exploded or disassembled perspective view of a representative embodiment of a facepiece described herein.
Figure 2:
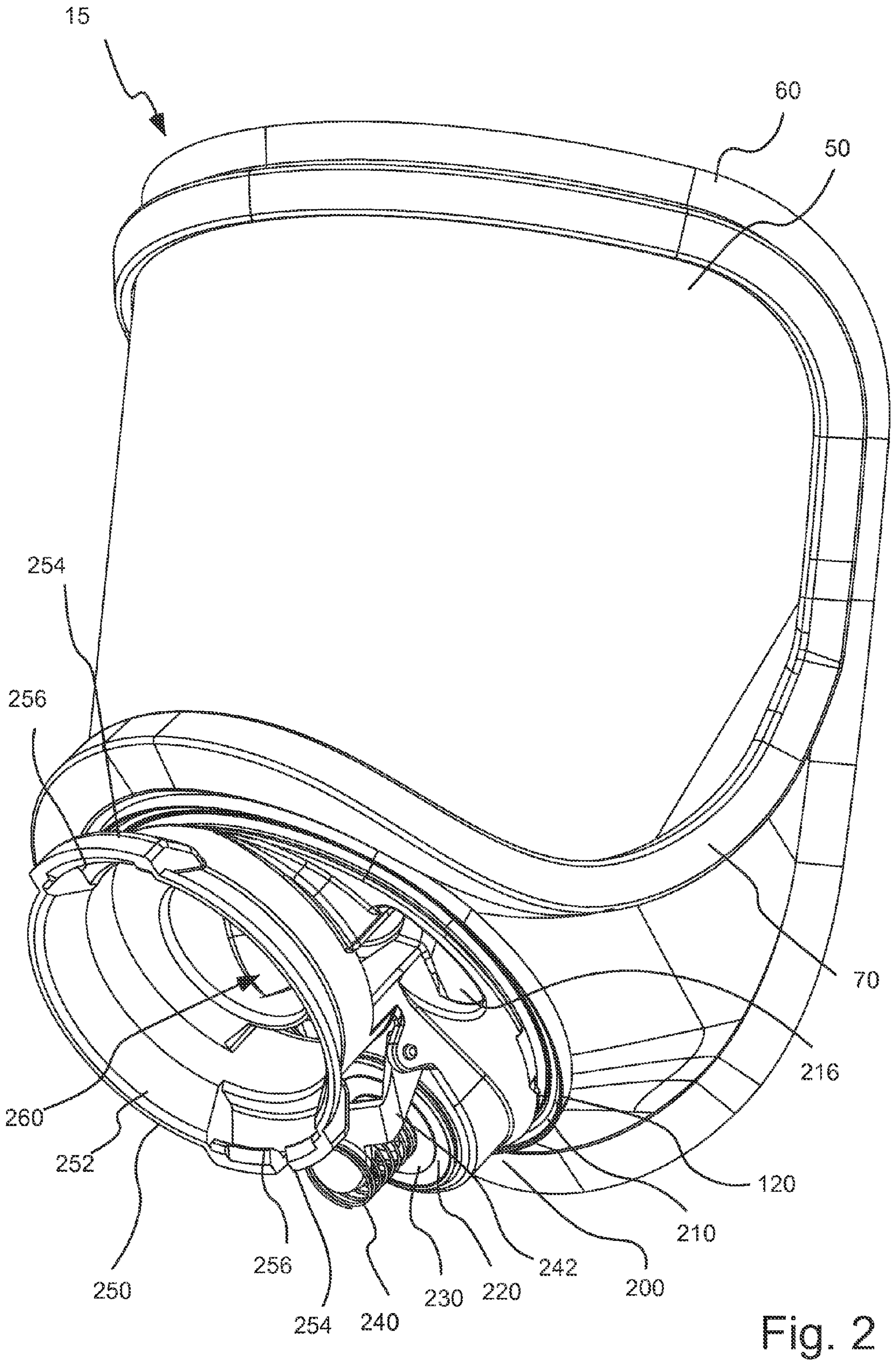
FIG. 2 illustrates a perspective view of a front section of the facepiece of FIG. 1.

FIGS. 1 through 7B illustrate a representative embodiment of a full facepiece or respirator face mask 10. As illustrated in FIG. 1, facepiece 10 may, for example, include a face blank 20 (fabricated, for example, from a silicon rubber) that includes a rear opening 30 which seals around the face of a user. In general, opening 30 includes a chin cupping section 32 that seals around the chin area of the user, side sections 34 that seal around the sides of the user's face and a forehead section (not shown in FIG. 1), opposite chin cupping section 32, that seals around the forehead of the user. Face blank 20 is sealingly attached to a forward section 15 (see, for example, FIG. 2) of facepiece 10, which includes lens 50 on an upper section thereof and respiration and/or filtering components formed in a lower section thereof. Face blank 20 may, for example, be sealingly attached to the forward section of facepiece 10 via a peripheral rim or edge 60.

As used herein in reference to facepiece 10 and other components, terms such as "front", "forward", "rear", "rearward", "up", "down" or like terms refer generally to reference directions associated with a person wearing facepiece 10 and standing upright.

Facepiece 10 may, for example, have attached thereto an attachment section 380 which can be connected to, for example, strapping to attach facepiece 10 to the head of the user and to maintain face blank 20 of respirator mask 10 in sealing engagement with the face of the user.

Lens 50, through which the user views the surrounding environment, is attached to an upper portion of the front section 15 of facepiece 10 via a sealing rim 70. Respiration and/or filtering components are attached to front section 15 of facepiece 10 below lens 50. As illustrated, for example, in FIG. 1A, facepiece 10 includes a generally central port or opening 100. Port 100 is formed in the forward end of an extending wall section 120 that extends forward from the remainder of the lower portion of front section 15.

A respirator component structure of housing 200 is attached to forward extending section 120. In that regard, housing 200 forms a sealed engagement, fit or connection with the internal wall of extending section 120. Housing, 200 may, for example, include a channel or groove 210 around the periphery thereof which forms a sealing engagement with the internal wall of extending section 120 (see, for example, FIG. 4A). Housing 200 may be of generally any shape to sealingly seat in a port of virtually any cooperating shape.

Figure 4A:
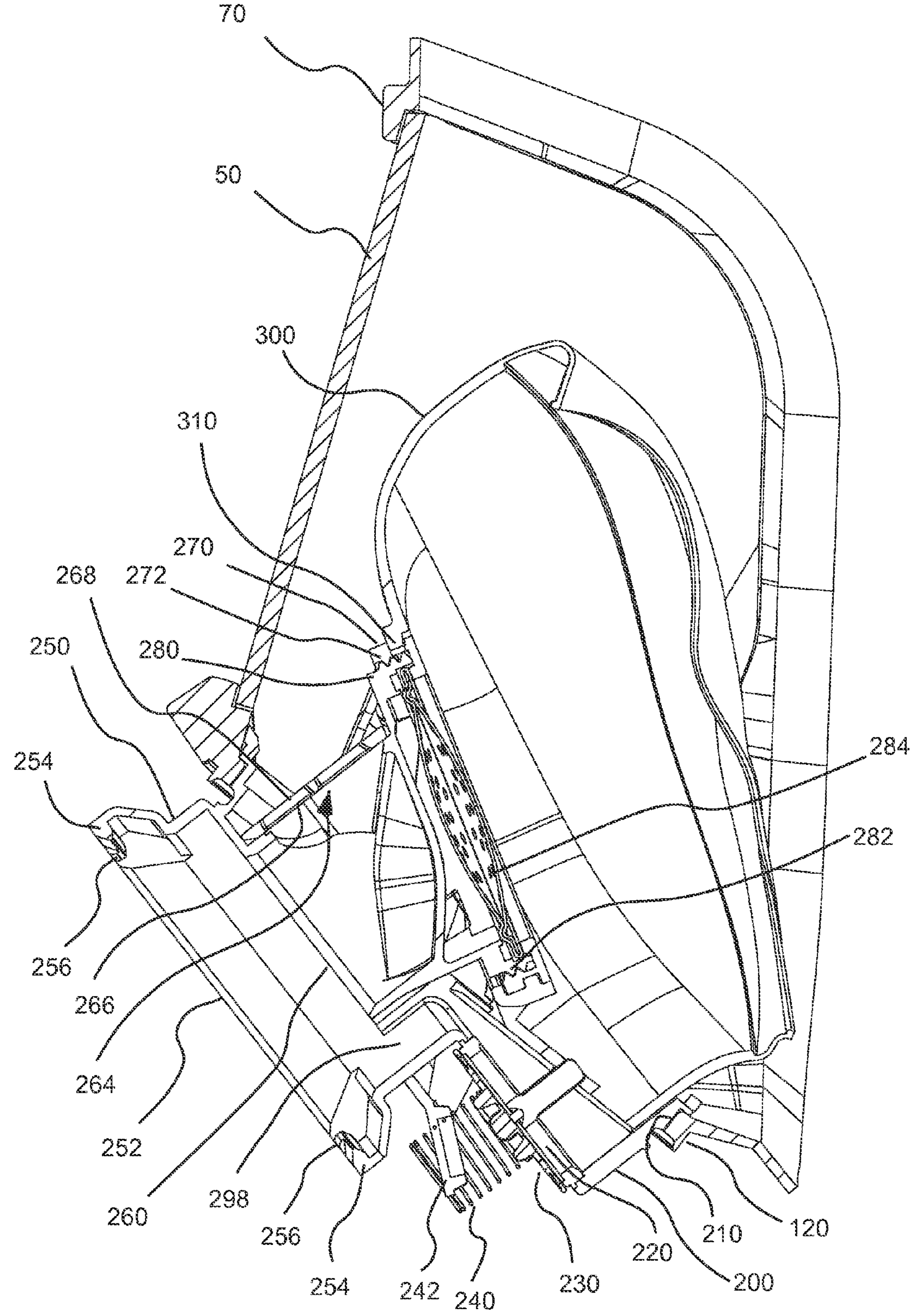
FIG. 4A illustrates a cross-sectional view of the front section of the facepiece.

Housing 200 also includes an exhalation port 220 (see, for example, FIG. 1) over which an sealing valve member 230 (for example, an umbrella valve member as known in the art; see, for example, FIG. 4A) is connected. In the illustrated embodiment, valve member 230 is biased in a closed position via, for example, a spring 240 (see, for example, FIG. 4A). Spring 240 is retained in connection with valve member 230 by a retainer 242. Biasing of valve member 230 results in a positive pressure within facepiece 10 as known in the art for operation in a pressure demand mode. Facepiece 10 may also be operated in a demand mode in which valve member 230 is not biased in a closed position. Valve 230 opens upon exhalation by a user of facepiece 10 but closes upon inhalation to prevent inspired air from passing through exhalation port 220.

An interface port 252 is formed in an interface portion or interface 250 of component housing 200 of facepiece 10 to place facepiece 10 in fluid connection with, for example, a second stage pressure regulator 400 or other regulator so that pressurized breathing gas (for example, air or oxygen) can be supplied from a pressurized air tank 500 (illustrated schematically in dashed lines in FIG. 1).

When connected to facepiece 10, pressure regulator 400 delivers breathing gas to the user on demand. As known in the art, pressure regulator 400 may, for example, include a diaphragm 402 biased by a spring 404 that divides the regulator assembly into an inner chamber 406 (which is in fluid connection with an interior of facepiece 10 and generally has a pressure corresponding to the pressure within facepiece 10) and an outer chamber 408 (which is in fluid connection with the surrounding environment and generally has a pressure corresponding to the surrounding environment). See, for example, FIG. 8A. The pressure of the surrounding environment is typically ambient or atmospheric pressure. Diaphragm 402 is coupled to an actuating mechanism 410 which opens and closes an inlet valve 412. The user's respiration creates a pressure differential between inner chamber 406 and outer chamber 408 of the regulator assembly 400 which, in turn, causes displacement of diaphragm 402 thereby controlling (that is, opening and closing) inlet valve 412 via mechanism 410. As a result, regulators such as regulator 400 are often called pressure demand regulators. An example of a pressure regulator operating in a similar manner to that described above to provide breathing gas to a user is the FIREHAWK® regulator available from Mine Safety Appliances Company of Pittsburgh, Pa.

Figure 8A:
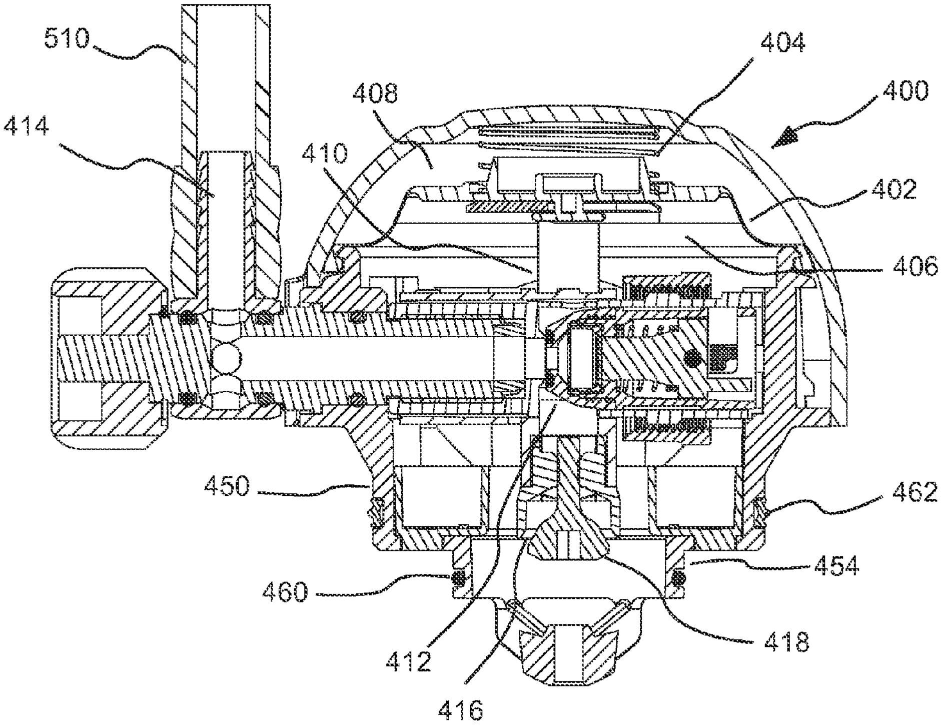
FIG. 8A illustrates a side, cross-sectional view of the pressure regulator.
Figure 8B:
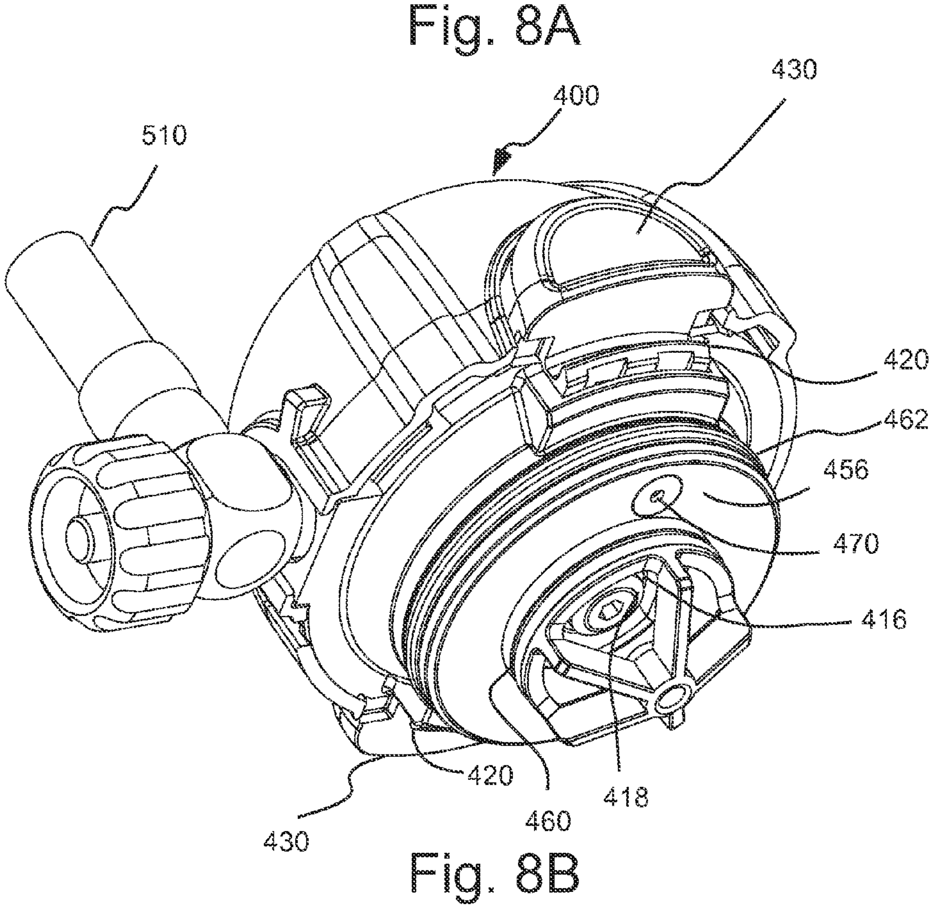
FIG. 8B illustrates a perspective view of the pressure regulator of FIG. 8A.
Figure 8C:
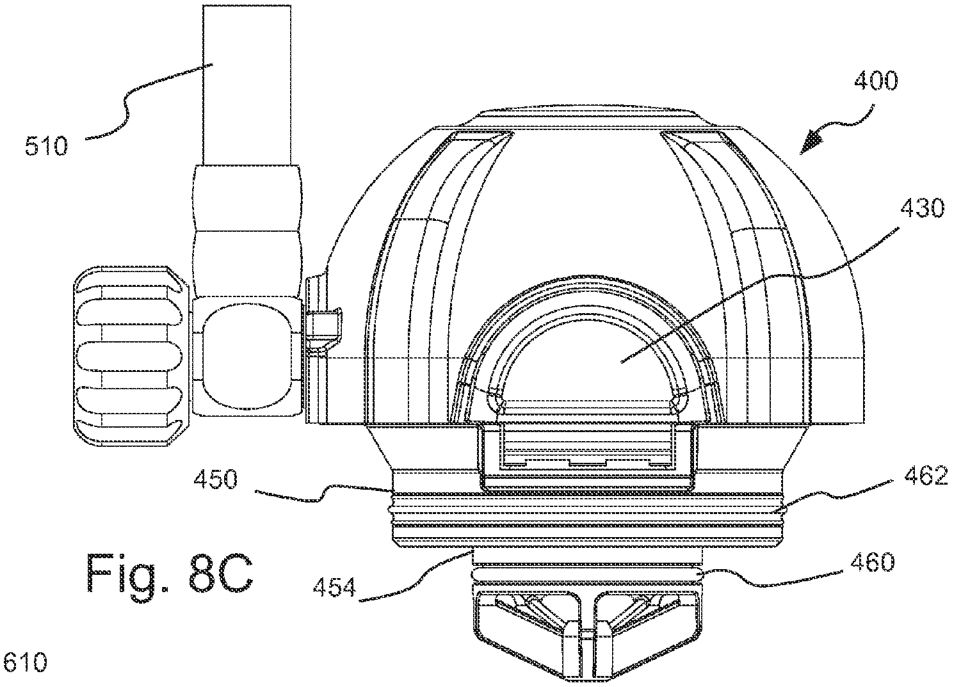
FIG. 8C illustrates a side view of the pressure regulator of FIG. 8A.

As illustrated in FIG. 8A, an inlet 414 of regulator 400 may, for example, be connected to pressurized air tank 500 via a flexible hose 510. Inlet 414 may be a barbed inlet as known in the art for secure connection to hose 510. An outlet 416 is in fluid connection with valve 412. A flow adjustment mechanism 418 may, for example, be placed in connection with outlet 416 as known in the art.

In the illustrated embodiment, spring loaded retaining flanges 420 of pressure regulator 400 (see, for example, FIGS. 1 and 6) form a releasable connection with cooperating mounting flanges 256 of mounting interfaces 254 on the perimeter of interface port 252. Pressure regulator 400 includes release buttons 430 on each side thereof which can be depressed to release pressure regulator from connection with regulator port 252.

Figure 4B:
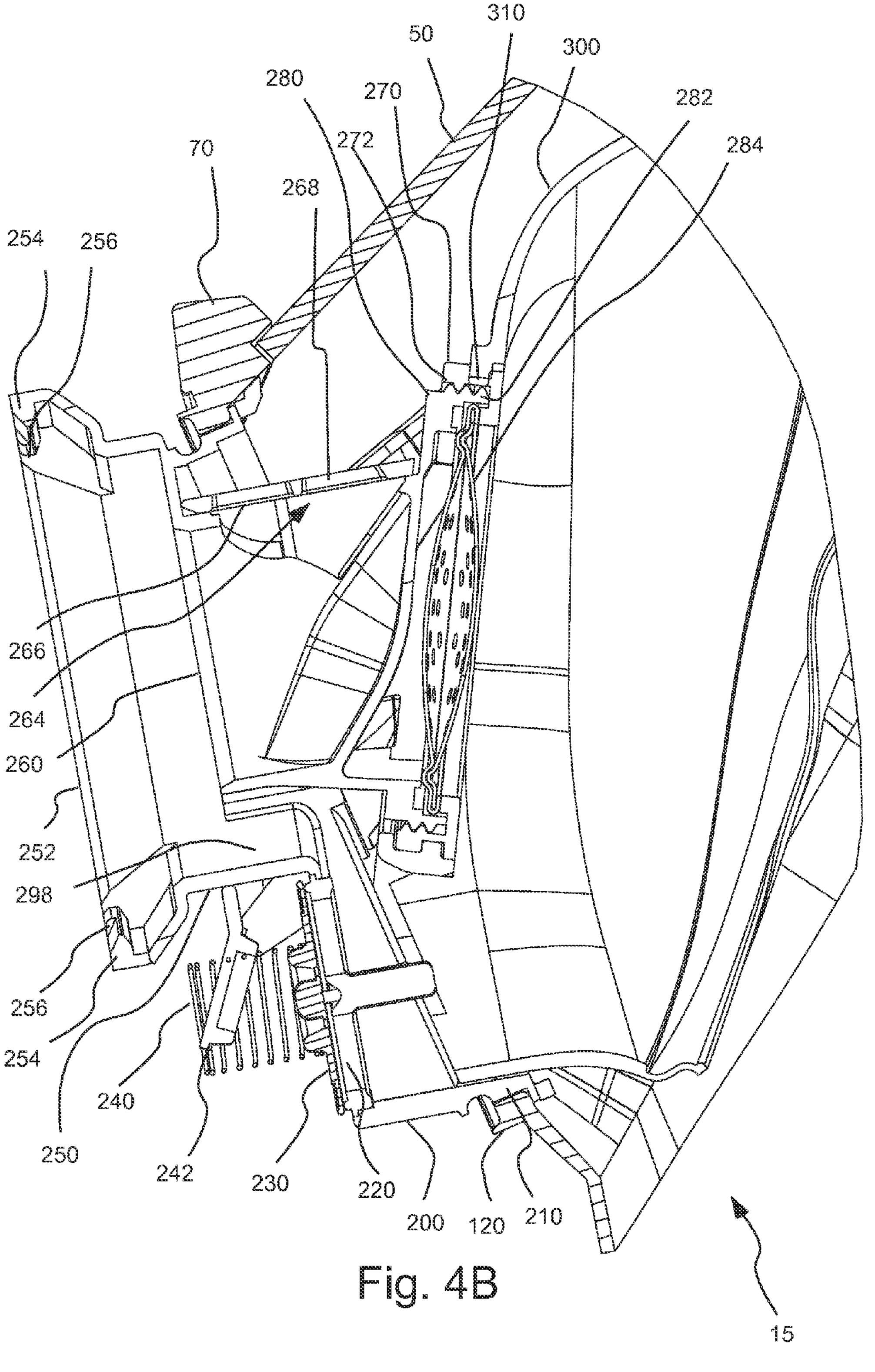
FIG. 4B illustrates an enlarged cross-sectional view of a portion of the front section of the facepiece.
Figure 5:
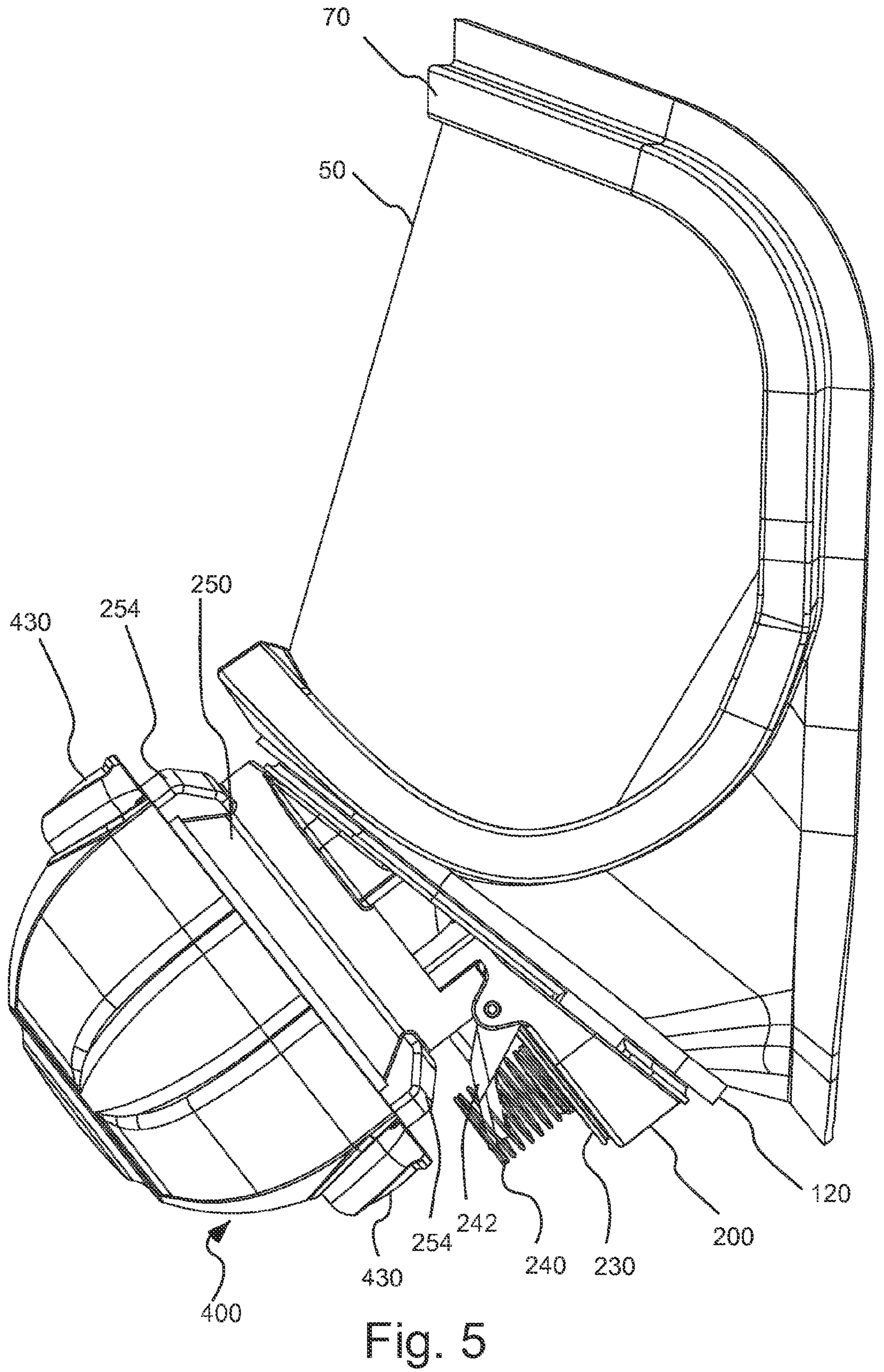
FIG. 5 illustrates a side view of the front section with an embodiment of a pressure regulator attached thereto.
Figure 6:
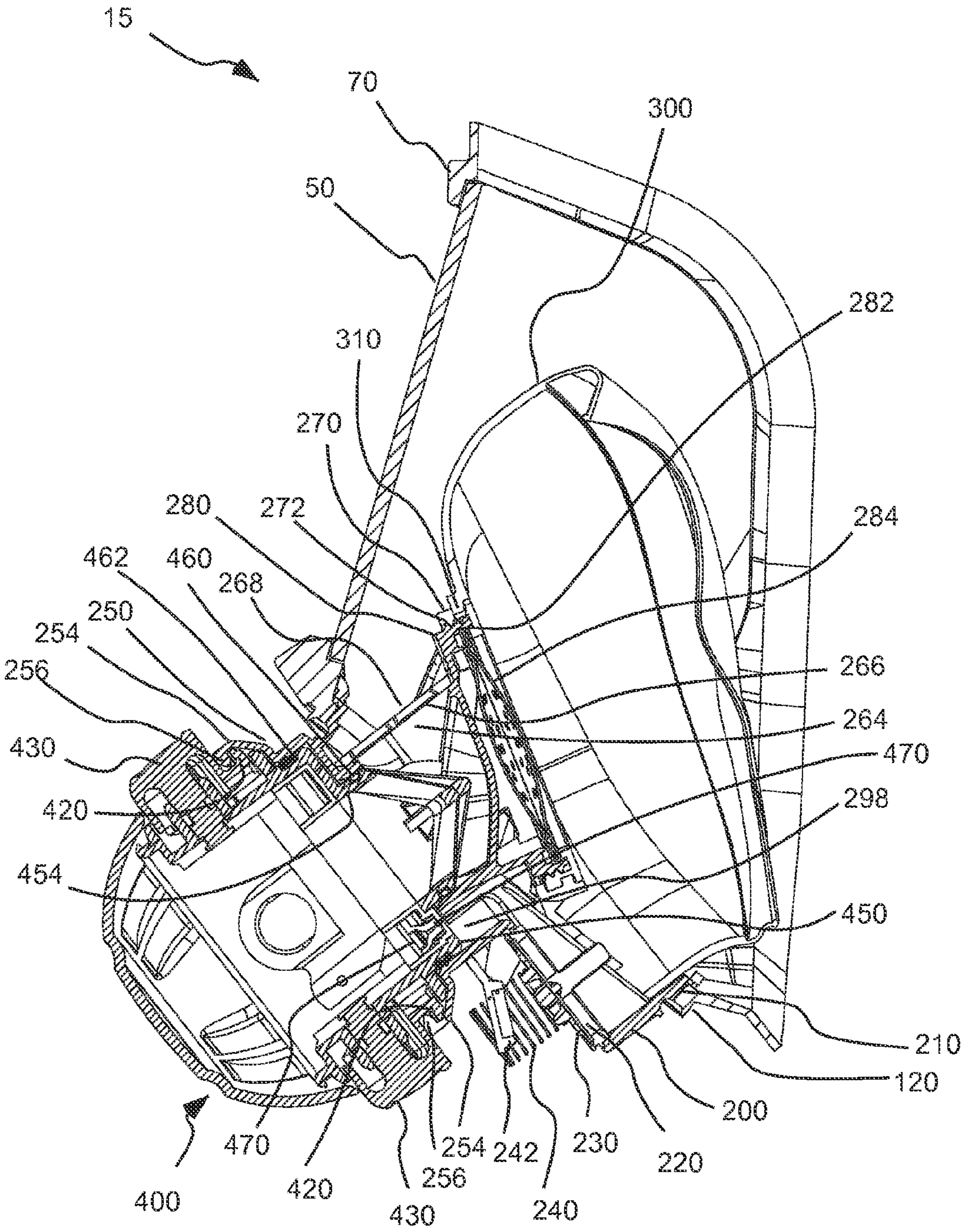
FIG. 6 illustrates a side, cross-sectional view of the front section and the pressure regulator, which is attached to the front section.

An inhalation port 260 is in fluid connection with interface port 252 and provides a port for entry of, for example, pressurized air from pressure regulator 400 into the interior of facepiece 10 (see, for example, FIGS. 4A and 4B). In that regard, inhalation port 260 is in fluid connection with an inhalation check valve 264 including, for example, a valve seating 266 and a flexible flap valve 268. Inhalation valve 264 opens upon inhalation by a user of facepiece 10 but closes upon exhalation to prevent expired air from passing through inhalation port 260. Contamination of pressure regulator 400 via inhalation port 260 during exhalation is thereby prevented.

In a number of embodiments, respirator mask 10 may, for example, also include a nose cup 300 that assists in directing the flow of air within respirator mask 10. Nose cup 300, which encompasses the nose and chin portion of the face, may, for example, be formed integrally from an elastomeric polymeric material such as an elastomer (for example, silicone). In the illustrated embodiment, nose cup 300 is attached to component housing 200 from the rear by, for example, extending or stretching a forward port or opening 310 of nose cup 300 around a flange 270 which is attached to component housing 200 via threading 272 on flange 270 and cooperating threading 282 on a rearward element 280 of component housing 200. Nosecup 300 may, for example, include one or more inhalation check valves 320. In the illustrated embodiment, a speech voicemitter 284 is positioned between port 310 and rearward element 280 to help provide intelligible speech transmittance through facepiece 10. In several embodiments, voicemitter 284 was formed from a thin film enclosed in a perforated aluminum housing. Passages such as passages 216 may, for example, be formed in housing 200 to facilitate voice transmittal.

Respirator mask 10 also includes a housing cover 288 (see FIG. 1) that is removably attachable to component housing 200. Cover 288 may, for example, be injection molded as an integral part from a resilient polymeric material such as, for example, a polycarbonate, a polyester or a polycarbonate/polyester blend. Component housing 200 may, for example, be injection molded from a polymeric material in generally the same manner as cover 288. Likewise, lens 50 may, for example, be injection molded from a polymeric material (for example, a transparent polycarbonate).

Figure 3:
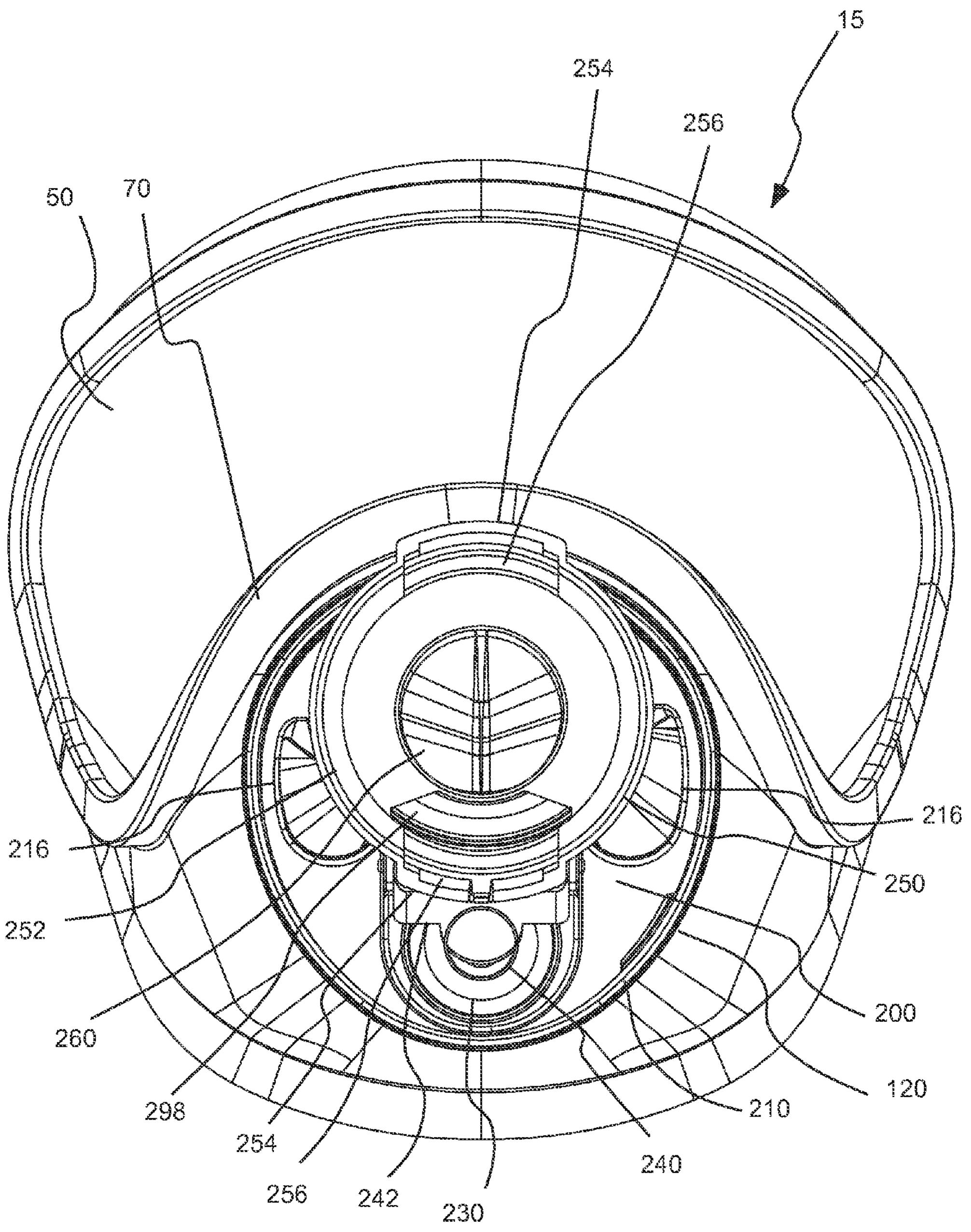
FIG. 3 illustrates another perspective view of the front section of the facepiece.

As, for example, illustrated in FIG. 3, an open, ambient or standby port 298 is formed in interface 250 of component housing 200. Ambient port 298 is formed separately from inhalation port 260 and from exhalation port 220 and is in fluid connection with the interior of facepiece 10/nose cup 300 via a fluid pathway different from the fluid pathway connecting inhalation port 260 to the interior of facepiece 10/nose cup 300. In the illustrated embodiment, ambient port 298 is in fluid connection with an interior of facepiece 10/nose cup 300 such that there are no intervening check valves between ambient port 298 and the user's nose/mouth (see, for example, FIG. 7A).

Ambient port 298 provides a flow path between the interior of facepiece 10/nose cup 300 and the ambient atmosphere when pressure regulator 400 is removed from connection with facepiece 10, and facepiece 10 is used in an ambient or standby mode. By providing a fluid path between ambient air and the user without intervening check valves, ambient port 298 reduces resistance to both inhalation and exhalation as compared to some facepieces in which inhalation and exhalation must occur through check valves when the facepiece is operated in an ambient mode. Ambient port 298 further provides a generally unobstructed or direct path for voice transmission from facepiece 10.

Unlike other facepieces in which an open port is provided in fluid connection between the wearer and the ambient atmosphere without an intervening check valve, ambient port 298 is formed separately from both inhalation port 260 and exhalation port 220. In other facepieces in which an ambient port is in fluid connection with the inhalation port and/or exhalation port, contamination of the regulator by a user's breath is problematic. As discussed above, regulators are often shared between users and cross-contamination can occur.

Figure 7A:
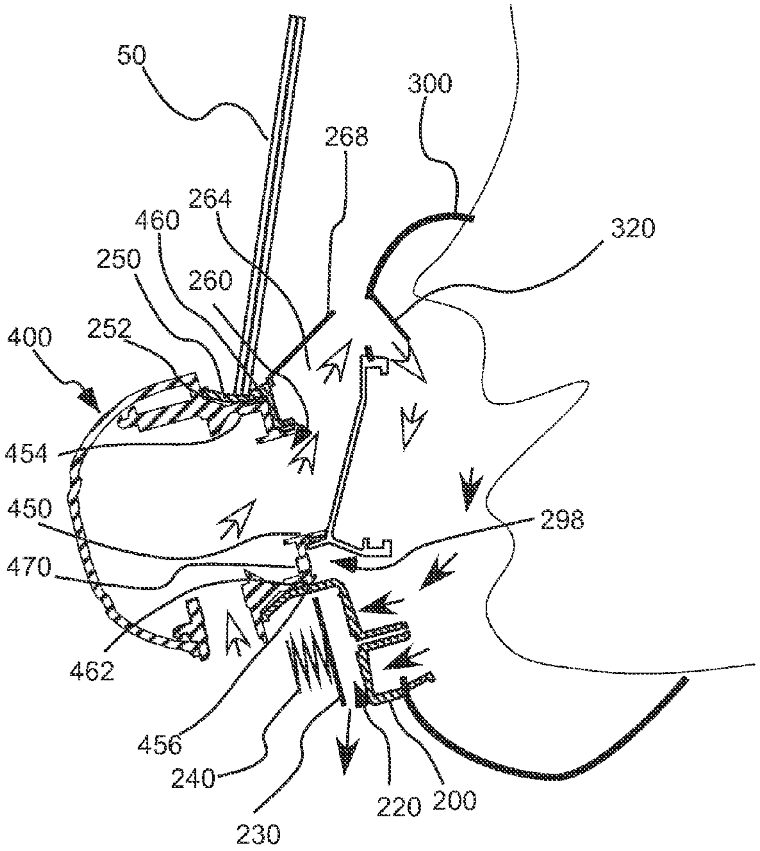
FIG. 7A illustrates a schematic cross-sectional view of flow through the facepiece during inhalation (open arrows) and during exhalation (filled arrows) when a pressure regulator is attached to the facepiece.

As illustrated in FIG. 7A, upon connection of pressure regulator 400 to pressure regulator interface 250, pressure regulator 400 seals ambient port 298 from the ambient atmosphere and to prevent exhaled air from entering pressure regulator 400. In the illustrated embodiment, pressure regulator 400 includes a first generally cylindrical rearward extending section 450, which extends into interface 250, and a second generally cylindrical rearward extending section or nozzle 454 which extends rearward from first rearward extending section 450 (and having a diameter smaller than the diameter of first rearward extending section 450) to enter inhalation port 260. Second rearward extending section 454 includes at least one sealing member 460 (for example, an elastomeric element such as an O ring), which forms a seal with inhalation port 260 (for example, with an inner wall thereof). First rearward extending section 450 of pressure regulator 400 also includes at least a second sealing member 462 (for example, an elastomeric element such as an O ring), which forms a seal with interface 250 (for example, with an inner wall thereof). Upon connection of pressure regulator 400, inhalation occurs only through inhalation port 260 and inhalation check valve 264, while exhalation occurs only through exhalation port 220, as described above and as illustrated in FIG. 7A (wherein, once again, inhalation is represented by open arrows and exhalation is represented by filled arrows).

Figure 7B:
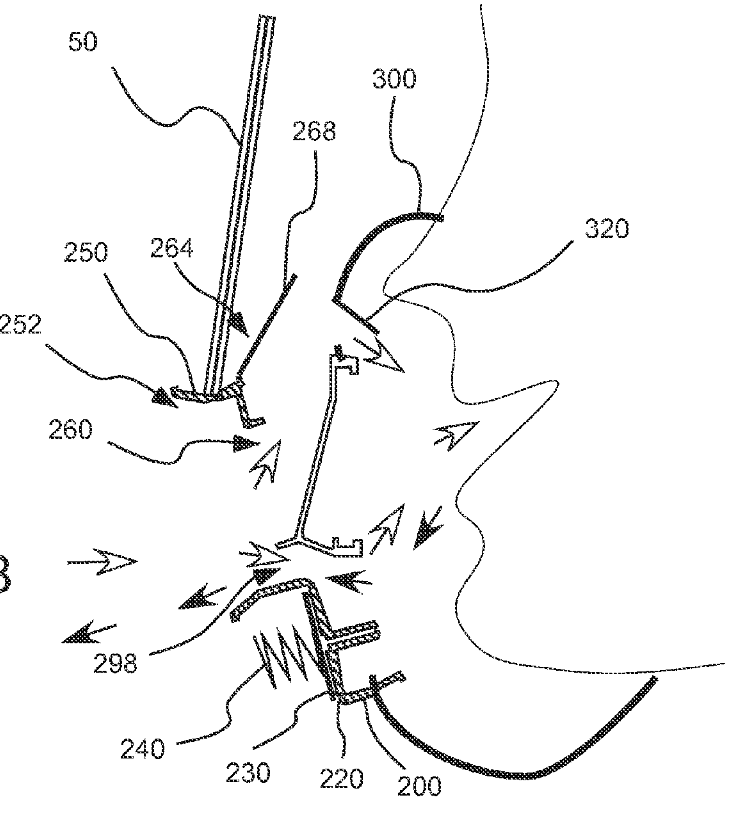
FIG. 7B illustrates a schematic cross-sectional view of flow through the facepiece during inhalation (open arrows) and during exhalation (filled arrows) when the pressure regulator is removed from attachment to the facepiece and the ambient or stand-by port in an open state.

As illustrated in FIG. 7B, when pressure regulator 400 is removed from connection with interface 250, inhalation air and exhalation air can pass directly through ambient port 298. The inhalation path is represented by unfilled arrows, while the exhalation path is represented by filled arrows. As also illustrated in FIG. 7B, inhalation can also occur through inhalation port 260 and inhalation check valve 264, for example, in the case of labored or heavy breathing. Exhalation also occurs through ambient port 298. In that regard, upon exhalation, by the user, inhalation check valve 264 closes and exhalation occurs only through ambient port 298. In embodiments in which there is no biasing of exhalation valve 230, exhalation may also occur through exhalation valve 230, particularly in the case of labored or heavy breathing. Thus, only the surfaces of component housing 200 in the vicinity of ambient port 298 can become contaminated by the user's exhaled breath.

Ambient port 298 may be sealed in other manners upon connection of pressure regulator 400 to pressure regulator interface 250. For example, in an alternative embodiment, pressure regulator 400 may include a section which enters ambient port 298 and forms a seal with an inner wall thereof (for example, via a sealing member such as an O-ring).

After use in the ambient mode and subsequent connection of pressure regulator 400, only exterior surfaces of pressure regulator 400 in contact with the surfaces of ambient port 298 are contaminated as a result of the user's breathing during use in the ambient mode. Such surfaces can be readily disinfected (for example, by swabbing with a disinfectant) before use of pressure regulator 400 by another user if desired. However, use of a disinfectant is not necessary. Cross-contamination between users will not occur even if a pressure regulator contaminated via use with a facepiece as described herein is used in connection with another facepiece as described herein.

Pressure regulator 400 may include or have connected thereto in the vicinity of a section or surface 456 (which is generally adjacent to ambient port 298 upon connection of pressure regulator 400 to interface 250) a microphone 470 for transmission of the user's voice. Such positioning of microphone 470 provides a generally direct path between the user's mouth and microphone 470. Sealing member 462 provides a seal between microphone 470 and the ambient atmospheres. Pressure regulator 400 and sealing member 462 thereof protect microphone 470 from environmental elements such as dirt and water that can damage microphone 470.

Facepiece 10 can also be operated in, for example, an air purifying respirator (APR) mode by attachment of a respiration filter thereto via pressure regulator 400 using, for example, an adapter. The filter adapter can be used without having a higher breathing resistance when a filter is connected.

Figure 9A:
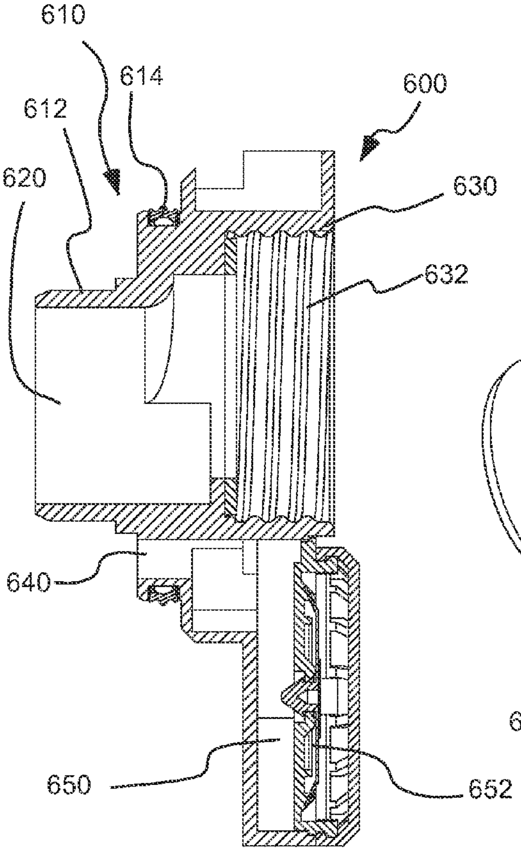
FIG. 9A illustrates a side, cross-sectional view of an embodiment of an adapter for attachment of a filter cartridge to the facepiece.
Figure 9B:
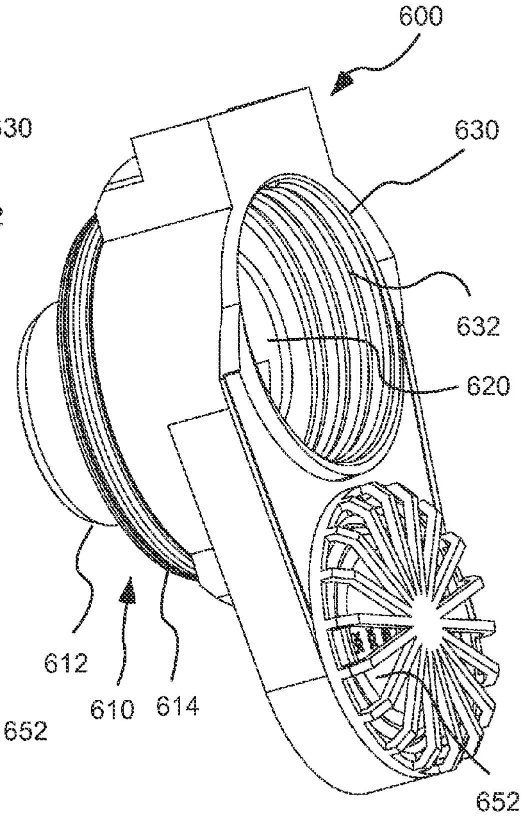
FIG. 9B illustrates a perspective view of the adapter.
Figure 10A:
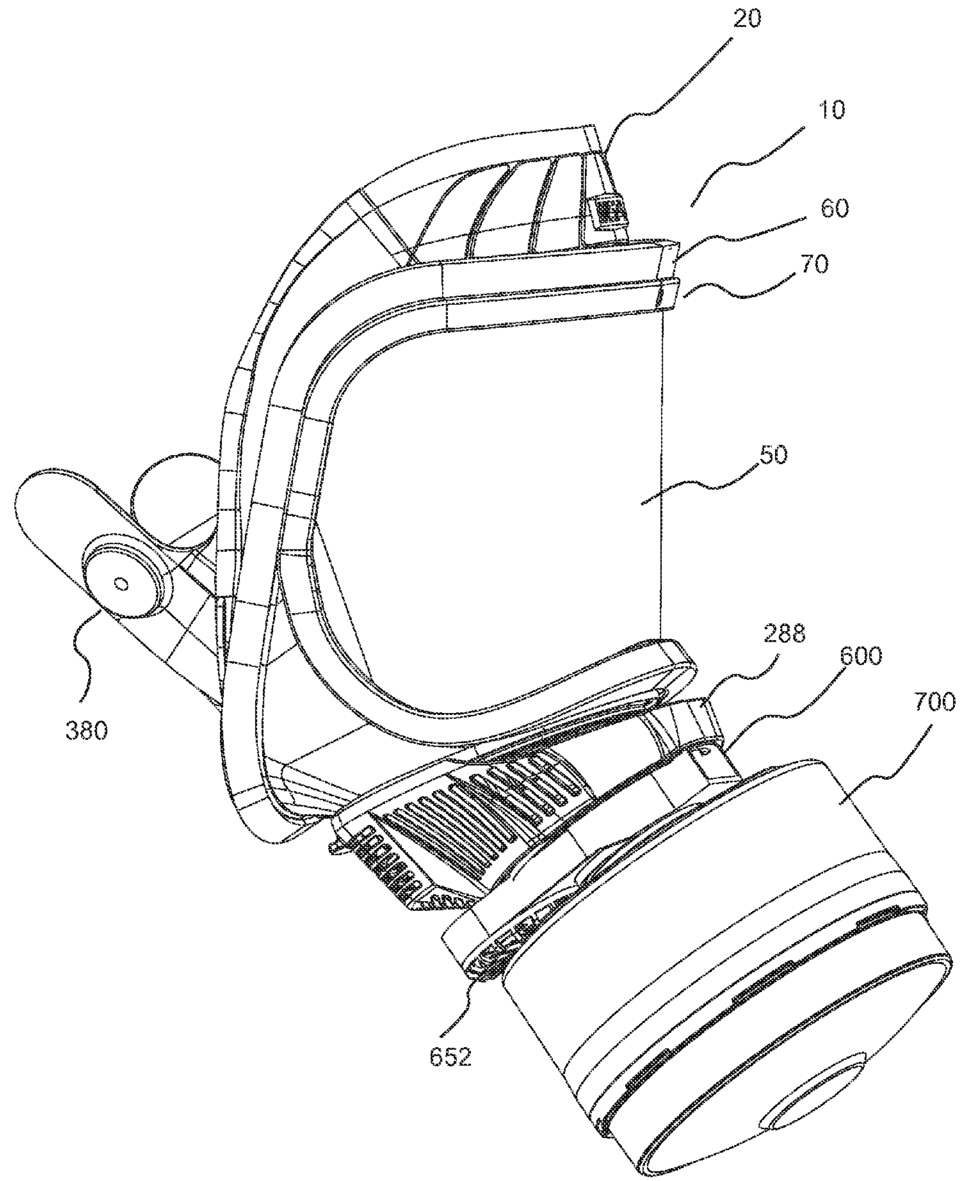
FIG. 10A illustrates a perspective view of the adapter attached to the facepiece and a filter cartridge attached to the adapter.
Figure 10B:
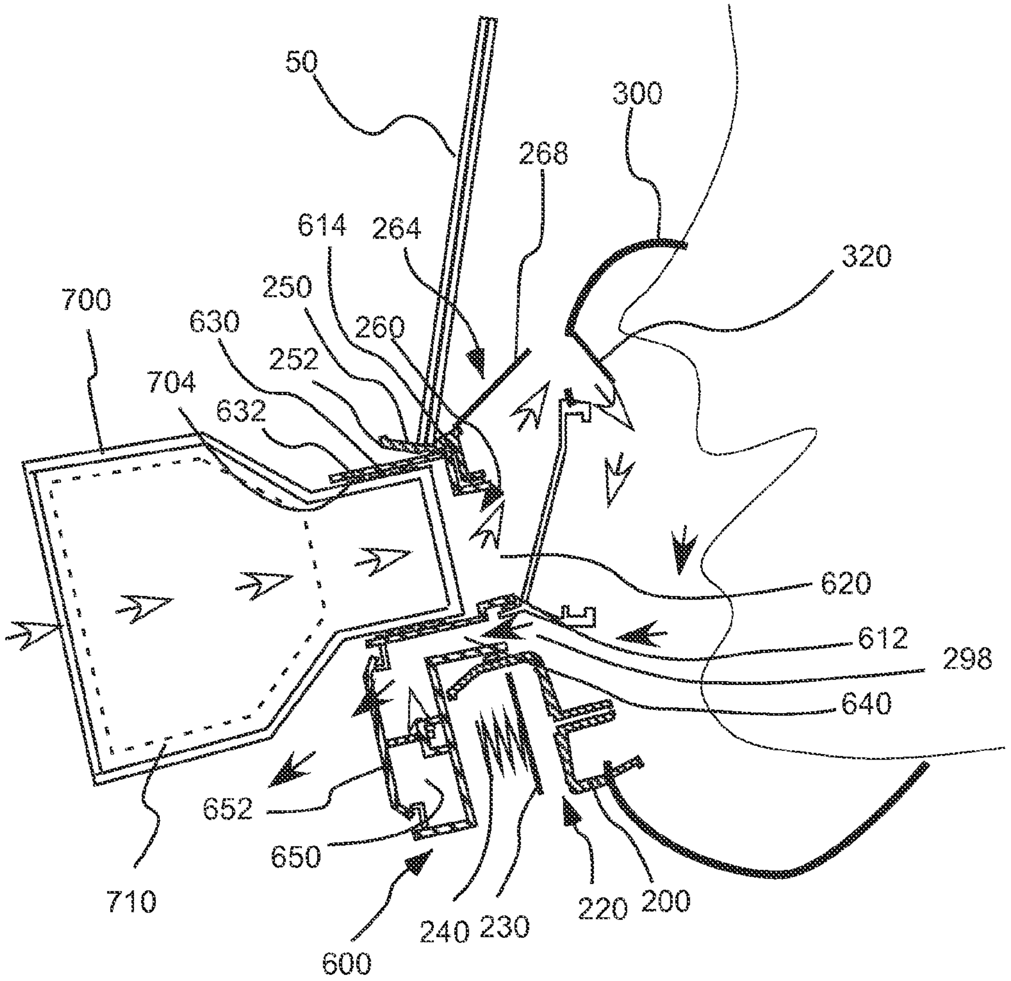
FIG. 10B illustrates a schematic side view of the adapter attached to the facepiece and a filter cartridge attached to the adapter, showing flow through the facepiece during inhalation (open arrows) and during exhalation (filled arrows).

FIGS. 9A and 9B illustrate an embodiment of an adapter 600 for use in connection with facepiece 10 for operative attachment of a filter, filter canister or filter cartridge 700 thereto (see FIGS. 10A and 10B). Adapter 600 includes a facepiece interface 610 on a rearward portion thereof which, for example, includes attachment mechanisms to cooperate with mounting flanges 256 of mounting interfaces 254 on the perimeter of interface port 252 of interface 250 to removably attached adapter 600 to interface 250. Such attachment mechanisms may, for example, operate in a manner similar to flanges 420 of pressure regulator 400.

Adapter 600 further includes a filter interface 630 on a forward portion thereof to removably attach a filter 700 thereto. In the illustrated embodiment, filter interface 630 include threading 632 which cooperates with cooperating threading 704 on filter 700. Other cooperating attachment mechanisms as known in the attachment arts may be used. As illustrated in FIG. 10B, filter 700 includes at least one filter medium 710 therein to filter contaminants from the ambient atmosphere. Filter cartridges including various filter media for filtering various contaminants from the ambient atmosphere are, for example, available from Mine Safety Appliances Company under the marks ADVANTAGE® Respirator Cartridges and COMFO® Respirator Cartridges.

Adapter 600 includes an inhalation passage 620 passing therethrough which is placed in fluid connection with inhalation port 260 upon attachment of adapter 600 to interface 250. In the illustrated embodiment, a rearward extending section 612 of adapter 600, through which passage 620 passes, extends into inhalation port 260. Adapter 600 also includes at least a one sealing member 614 (for example, an elastomeric element such as an O-ring), which forms a seal with interface 250 (for example, with an inner wall thereof).

Adapter 600 further includes an exhalation passage 640 which is placed in fluid connection with ambient port 298 upon connection of adapter 600 with interface 250. Exhalation passage 640 is in fluid connection with an exhalation port 650 that may, for example, include an umbrella valve 652 as known in the art. Expired air from the user can thereby pass through ambient port 298, directly into passage 640 of filter adapter 600, and through umbrella valve 652 (which is not biased in closed position).

The foregoing description and accompanying drawings set forth embodiments. Various modifications, additions and alternative designs will, of course, become apparent to those skilled in the art in light of the foregoing teachings without departing from the scope hereof, which is indicated by the following claims rather than by the foregoing description. All changes and variations that fall within the meaning and range of equivalency of the claims are to be embraced within their scope.

What is claimed is:

1. A respiration system, comprising:
- a regulator comprising an inlet for connection to a source of pressurized gas comprising oxygen, and an outlet adapted to deliver the gas to a user; and
- a respiration facepiece for use in connection with the regulator comprising:
- a regulator interface to which the regulator is removably attachable;
- at least one seal system adapted to form a sealing engagement with a face of the user to encompass a nose and mouth of the user;
- an inhalation port in fluid connection with the regulator interface and in fluid connection with the interior of the facepiece;
- at least one inhalation check valve in fluid connection between the inhalation port and the interior of the facepiece;
- an exhalation port in fluid connection with the facepiece;
- an exhalation check valve in fluid connection with the exhalation port; and
- an ambient port separate from the inhalation port and from the exhalation port, the ambient port being in fluid connection with the interior of the facepiece without an intervening check valve, wherein the ambient port is in fluid connection with the regulator interface such that the regulator seals the ambient port from fluid connection with the outlet of the regulator upon connection of the regulator to the regulator interface.

2. The system of claim 1 wherein the inhalation port and the ambient port are formed in the regulator interface.

3. The system of claim 2 wherein the regulator includes at least one sealing member to seal the ambient port from fluid connection with the outlet of the regulator upon connection of the regulator to the regulator interface.

4. The system of claim 3 wherein the regulator comprises a first sealing member to form a seal with the inhalation port and a second sealing member to form a seal with the regulator interface.

5. The system of claim 1 further comprising an adapter to attach a filter to the regulator interface, the adapter comprising a facepiece interface adapted to connect to the regulator interface of the facepiece and a filter interface adapted to connect to the filter.

6. The system of claim 5 wherein the adapter comprises an inhalation passage and a separate exhalation passage, the inhalation passage being in fluid connection with the inhalation port of the facepiece and the exhalation passage being in fluid connection with the ambient port when the adapter is attached to the regulator interface of the facepiece.

7. The system of claim 6 wherein the adapter further comprises an exhalation check valve in fluid connection with the exhalation passage.

8. The system of claim 1 wherein the regulator further comprises a microphone.

9. The system of claim 8 wherein the microphone is positioned to be in general alignment with the ambient port when the regulator is connected to the regulator interface.

10. A method of reducing resistance to breathing in a facepiece for use with a regulator comprising an inlet for connection to a source of pressurized gas comprising oxygen; comprising:
- providing a regulator interface to which the regulator is removably attachable;
- providing at least one seal system adapted to form a sealing engagement with a face of a user to encompass a nose and mouth of the user;
- providing an inhalation port in fluid connection with the regulator interface and in fluid connection with the interior of the facepiece;
- providing at least one inhalation check valve in fluid connection between the inhalation port and the interior of the facepiece;
- providing an exhalation port in fluid connection with the facepiece;
- providing an exhalation check valve in fluid connection with the exhalation port;
- providing an ambient port separate from the inhalation port and the exhalation port, the ambient port being fluid connection with the interior of the facepiece without an intervening check valve, wherein the ambient port is in fluid connection with the regulator interface such that the regulator seals the ambient port from fluid connection with the outlet of the regulator upon connection of the regulator to the regulator interface; and
- passing atmospheric gas through the ambient port into the interior of the facepiece upon inhalation by the user when the regulator is detached from the regulator interface.

11. The method of claim 10 wherein the inhalation port and the ambient port are formed in the regulator interface.

12. The method of claim 11 further comprising forming a sealing connection between the regulator and the regulator interface.

13. The method of claim 10 wherein the regulator comprises a microphone positioned to be in general alignment with the ambient port when the regulator is connected to the regulator interface.

* * * * *